United States Patent [19]
De Jong

[11] Patent Number: 5,503,446
[45] Date of Patent: Apr. 2, 1996

[54] DEVICE FOR GRIPPING AND HANDLING OBJECTS

[76] Inventor: Dirk De Jong, Merellaan 6, NL-2566 JV The Hague, Netherlands

[21] Appl. No.: 232,226

[22] PCT Filed: Aug. 11, 1992

[86] PCT No.: PCT/NL92/00142

§ 371 Date: May 5, 1994

§ 102(e) Date: May 5, 1994

[87] PCT Pub. No.: WO93/09538

PCT Pub. Date: May 13, 1993

[30] Foreign Application Priority Data

Nov. 5, 1991 [NL] Netherlands ............................ 9101846

[51] Int. Cl.⁶ .................................. B25B 9/02; B25J 1/02
[52] U.S. Cl. ................................ 294/94; 294/100
[58] Field of Search ............................. 294/15, 16, 27.1, 294/33, 93–97, 99.2, 100, 116; 29/270, 278, 280, 283, 758, 764

[56] References Cited

U.S. PATENT DOCUMENTS

| | | | |
|---|---|---|---|
| 1,197,648 | 9/1916 | Meyers | 294/95 X |
| 1,770,182 | 7/1930 | Ritter | 294/100 X |
| 2,503,426 | 4/1950 | Tower | 29/283 |
| 2,669,896 | 2/1954 | Clough | 294/100 X |
| 2,721,492 | 10/1955 | Prevost | 294/96 X |
| 3,481,641 | 12/1969 | Berger et al. | 294/100 |
| 3,574,381 | 4/1971 | Ocheltree et al. | 294/94 X |
| 3,588,983 | 6/1971 | Hoy | 294/94 X |
| 3,844,291 | 10/1974 | Moen | 294/100 X |
| 4,052,788 | 10/1977 | Hastings et al. | 29/278 X |
| 4,283,082 | 8/1981 | Tracy | 294/93 X |
| 4,463,981 | 8/1984 | Curry | 294/100 |
| 4,726,615 | 2/1988 | Goldberg | 294/16 |
| 4,997,224 | 3/1991 | Pierce | 294/16 |
| 5,195,794 | 3/1993 | Hummel et al. | 294/94 |

FOREIGN PATENT DOCUMENTS

| | | |
|---|---|---|
| 2428296 | 1/1980 | France . |
| 149207 | 3/1955 | Sweden ............................... 294/100 |
| 2165180 | 4/1986 | United Kingdom . |
| WO91/19291 | 12/1991 | WIPO . |

OTHER PUBLICATIONS

By D. Thornburg, "Substrate Holding Device", Xerox Disclosure Journal, May/Jun. 1979, vol. 4, No. 3, pp. 285–286.
"Pick–Up Tools for Rigid Disks", IBM Technical Disclosure Bulletin, Dec. 1985, vol. 28, No. 7, p. 3103.
"Magnetic Disk Lifter Tool", IBM Technical Disclosure Bulletin, Mar. 1989, vol. 31, No. 10, pp. 454–455.
"Radial Disk Clamp", IBM Technical Disclosure Bulletin, Apr. 1990, vol. 32, No. 11, pp. 20–21.

*Primary Examiner*—Johnny D. Cherry
*Attorney, Agent, or Firm*—Young & Thompson

[57] ABSTRACT

A device for gripping and handling objects with a hole, such as compact discs, comprises a hollow carrier to be placed against the object at the hole, which carrier has an extremity directed toward the object which extremity is internally provided with at least two gripping fingers, which can be displaced relative to each other in radial direction of the hole to be engaged, in order to grip a peripheral edge of the hole with outwardly directed barbs at free extremities of the fingers and which can be displaced in axial direction to move the fingers out of the extremity of the carrier. The fingers are controlled by cooperating cams on both the carrier and fingers. These cams are fixedly connected to the carrier and the finger respectively and have such a shape that during the first part of displacement of the fingers from the extremity, the barbs define a first radius and during a second part of the displacement, the barbs define a second radius smaller than the first radius. The cams on the carrier are located within the carrier and the cams on the gripping fingers are located on radially outer surfaces of the gripping fingers. A spring continuously urges the fingers to a position in which the barbs of the fingers define the first radius.

4 Claims, 2 Drawing Sheets

DEVICE FOR GRIPPING AND HANDLING OBJECTS

The invention relates to a device for gripping and handling objects with a hole, such as compact discs.

Such a device is generally known in the prior art. In particular in the case of compact discs and other relatively thin objects, the problem is that they are difficult to remove from the pack and to place in the pack or elsewhere without the fragile surface containing the important information being touched. Besides, compact discs are placed in rather a tight fit in boxes, and it is often difficult to undo this clamping force. According to the instructions, such compact discs should be gripped at the edge, in order to avoid fingermarks and the like on the surface containing the information.

The object of the invention is to provide a device by means of which it is simpler to grip such objects. This relates not only to the gripping of compact discs, but also to gramophone records or other objects provided with a hole which are difficult to grip in any other way.

The invention is based on the idea that for gripping of the objects in question at least one gripping element is moved to and fro relative to the center of the disc. In that way the disc can be engaged and disengaged. Clamping of the disc by the device according to the invention can be realized in at least two ways. In one of them the gripping elements comprise gripping means engaging one side of the disc and a support face engaging another side of the disc. In this embodiment in addition to the movement to and from from the center of the hole by the gripping means, these gripping means can also move relative to the support face in a direction of the thickness of the object to be engaged.

In another embodiment it is possible to realize the gripping elements in that they comprise jaws having an opening to engage the circumferential edge of the opening. In this embodiment it is not necessary to move the gripping elements in another direction than to and from the center of the opening of the hole.

While at least one of the gripping means is movable, the other gripping means can be in the form of a fixed supporting part which grips the edge of the object in question over its thickness or grips round it. All gripping elements are, however, preferably in the form of a gripping means.

The control means for the gripping means are preferably disposed on the end of the carrier away from the gripping means.

In order to make the gripping means move towards and away from each other, the control means preferably comprise a cam surface provided on the gripping means, and interacting with a support fixed on the carrier.

The gripping means preferably comprise a sleeve-shaped element provided with recesses, in order to define fingers. The distance between adjacent fingers here is made such that fixing means of a pack, such as the pack of a compact disc, can be accommodated between said fingers.

According to a further advantageous embodiment, spring means are present to move the gripping means into a position inserted in the carrier, i.e. the position in which the object is clamped.

Although the ends of the fingers of the gripping means can be made in any way known in the prior art, it is preferable if they are made barbed. In particular for thin objects, this has the advantage that it is easier to grip behind the peripheral edge. For thicker objects it would be possible to provide clamping in the thickness of the wall material. In order to place the device according to the invention in the correct position on the object, and more particularly to determine the angular position of the device relative to the hole in the object, according to a further embodiment, centering means are present.

The invention will be explained in greater detail below with reference to an example of two embodiments shown in the drawings, in which.

Figure 1:
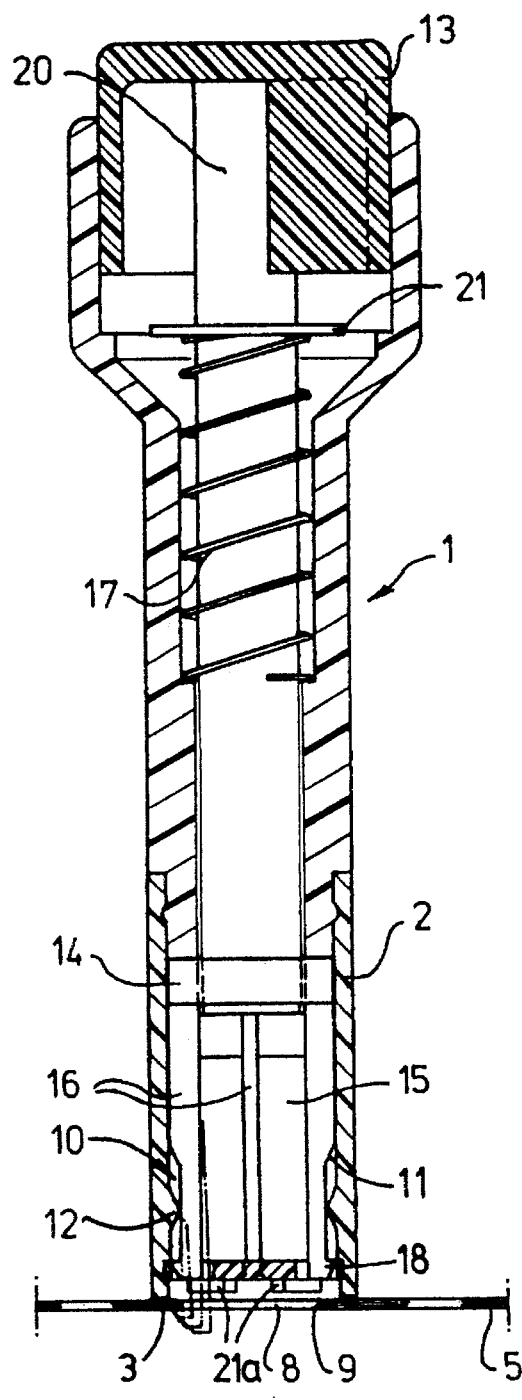
FIG. 1 shows schematically in cross-section the device according to the invention in the position in which the gripping means are brought in and brought fully out.

In FIG. 1 the device according to the invention is indicated in its entirety by 1. It comprises a carrier 2, which must be placed with the bottom end on an object 5 to be gripped, such as a compact disc. The supporting face of the carrier 2 is indicated by 3. The compact disc 5 is provided with a hole 8 with a peripheral edge 9. A push button 13, connected by means of a stem 20 to a sleeve 14, is present in the carrier 2. Said sleeve 14 is provided with recesses 15, in order to define fingers 16. Stem 20 has provided on it a flange 21, on which a compression spring 17 acts, pushing stem 20 upwards in FIGS. 1 and 2. Control means 10 are present to control the distance between opposite fingers 16. These fingers 16, or more generally the gripping means, are moved inwards through interaction with a support 12 fixed on carrier 2 and a cam track 11 provided on finger 16.

Fingers 16 are provided at the bottom end with barbed means 18, designed to grip underneath the compact disc.

Figure 3:
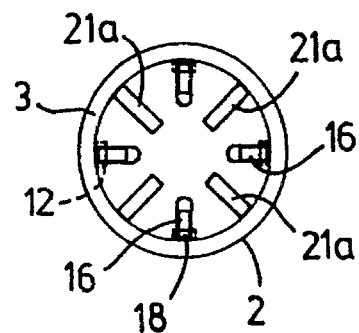
FIG. 3 shows a bottom view of the device according to FIG. 1.

It can be seen from FIG. 3 that the distance between adjacent fingers 16 is so great that projections can be accommodated between them. This is important particularly in the case of compact disc packs, where such discs are held in place by elements which are provided in the compact disc pack (not shown) and snap into the hole. With the fingers 16 according to the invention, it is possible to move between these clamping elements. In order to be able to move these fingers into the correct position between the clamping elements, centering cams 21 are provided at the underside of the supporting face. When the supporting face is being placed on the object, some of the holes between the clamping elements are used for accommodating these centering cams 21, while the fingers 16 can be inserted into the remaining holes.

Figure 2:
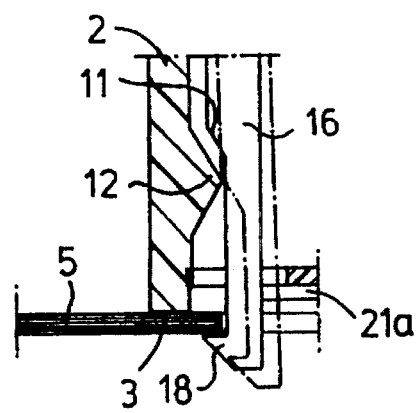
FIG. 2 shows the device according to FIG. 1 when the object is taken out and when it is in the gripped position.
Figure 4:
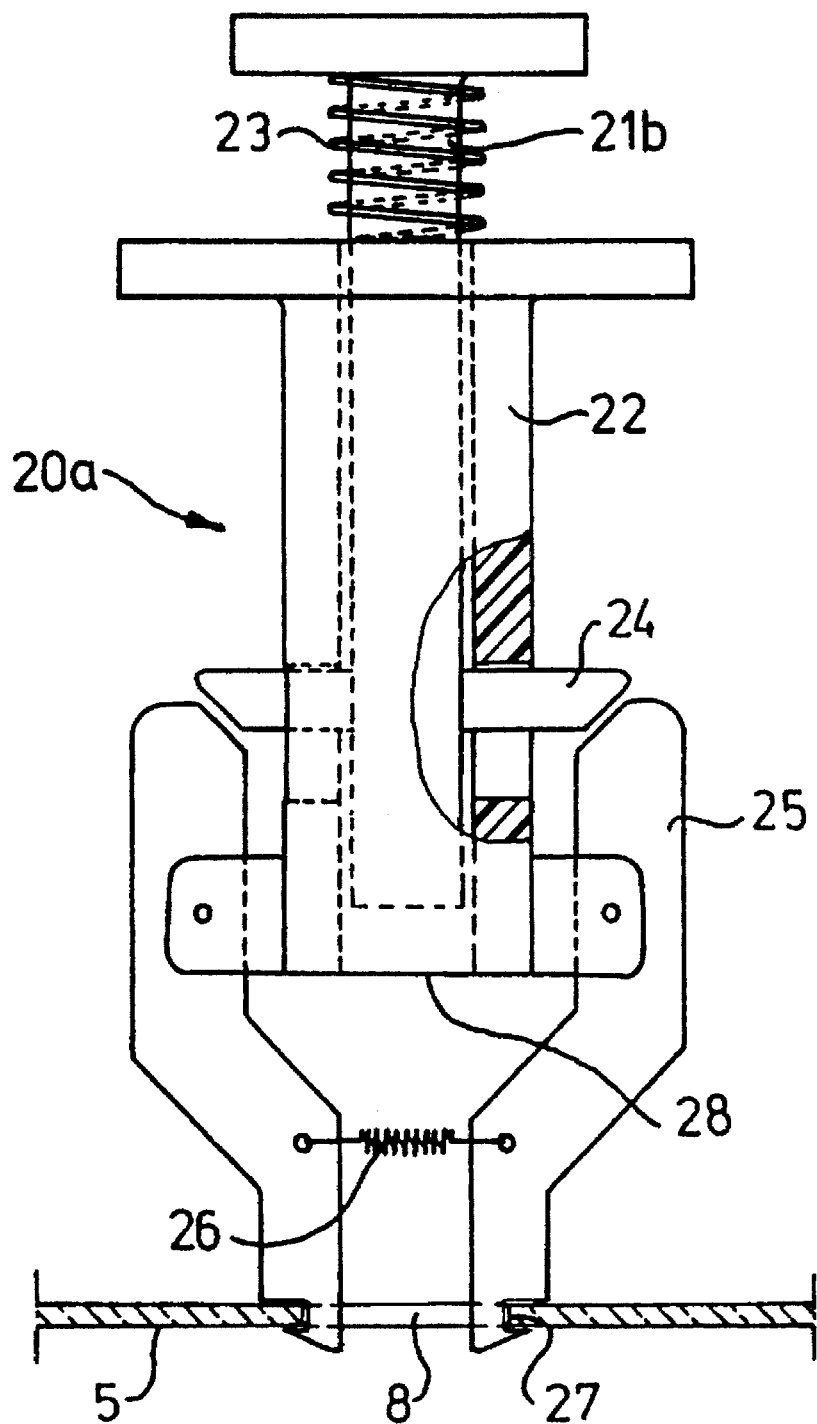
FIG. 4 shows, partially in cross section, a further embodiment of the device according to the invention.

The device described above works as follows. For the gripping of an object, button 13 is pressed, causing the fingers 16 to move inwards. When they move inwards, the distance between the fingers 16 becomes smaller through the interaction of support 12 and cam track 11. This makes it possible to move the fingers 16 through the hole 8. When the supporting face 3 comes into contact with compact disc 5, button 13 is released. Through the effect of spring 17, gripping means 16 move upwards, and through the interaction of cam track 11 and support 12, the fingers 16 move outwards, with the result that barbs 18 grip behind the peripheral edge of the hole, as shown in FIG. 2. After that, the compact disc can be removed from its pack and placed in the compact disc player by means of the relatively large gripping part of carrier 2. In FIG. 4 a further embodiment of the device according to the invention is generally indicated with 20. In this embodiment the gripping means comprise jaws 25 provided with an opening 27. Jaws 25 are pivotally connected to end 28 of carrier 22. In carrier 22 pusher 21 is provided through which cams 24 projecting through carrier 22 can be moved upwardly and downwardly against the force of a spring 23 urging them toward an upper position. This action is further supported by spring 26 such that during non-engagement of pusher 21, jaws 25 can freely move in and out of opening 8 of disc 5. As soon as pusher 21 is released, disc 5 is engaged. Although the invention can be used particularly advantageously for compact discs, it must be understood that it can also be used for other objects, in particular objects which are relatively thin and have a hole. All modifications in the design in order to achieve adaptation to the object in question fall within the scope of the present application.

I claim:

1. In a device for gripping and handling objects with a hole, comprising a hollow carrier to be placed against the object at the hole, which carrier has an extremity directed toward the object which extremity is internally provided with at least two gripping fingers, which can be displaced relative to each other in radial direction of the hole to be engaged, in order to grip a peripheral edge of said hole with outwardly directed barbed means at free extremities of said fingers and which can be displaced in axial direction to move the fingers out of the extremity of the carrier, wherein at least one said finger is controlled by control means, wherein the control means comprises cooperating cam means on both the carrier and said finger; the improvement wherein said cam means are fixedly connected to the carrier and the finger respectively and have such a shape that during the first part of displacement of the fingers from the extremity the barbed means define a first radius and that during a second part of the displacement the barbed means define a second radius smaller than the first radius.

2. A device as claimed in claim 1, wherein said cam means on said carrier are located within said carrier.

3. A device as claimed in claim 2, wherein said cam means on said at least two gripping fingers are located on radially outer surfaces of said at least two gripping fingers.

4. A device as claimed in claim 1, and spring means continuously urging the fingers to a position in which the barbed means of the fingers define said first radius.

* * * * *